(12) United States Patent
Reyes et al.

(10) Patent No.: US 9,051,510 B1
(45) Date of Patent: Jun. 9, 2015

(54) TREATMENT FLUIDS CONTAINING A PERFLUORINATED CARBOXYLIC ACID FOR USE IN SUBTERRANEAN FORMATION OPERATIONS

(71) Applicant: Halliburton Energy Services, Inc., Houston, TX (US)

(72) Inventors: Enrique Antonio Reyes, Tomball, TX (US); Aaron M. Beuterbaugh, Tomball, TX (US); Alyssa Lynn Smith, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/396,215

(22) PCT Filed: May 8, 2014

(86) PCT No.: PCT/US2014/037336
§ 371 (c)(1),
(2) Date: Oct. 22, 2014

(87) PCT Pub. No.: WO2015/053817
PCT Pub. Date: Apr. 16, 2015

(51) Int. Cl.
*E21B 43/25* (2006.01)
*C09K 8/74* (2006.01)

(52) U.S. Cl.
CPC .. *C09K 8/74* (2013.01); *E21B 43/25* (2013.01)

(58) Field of Classification Search
CPC ......................................................... C09K 8/74
USPC ........................................................ 507/205
See application file for complete search history.

(56) References Cited

U.S. PATENT DOCUMENTS

| 4,454,914 A | 6/1984 | Watanabe |
| 8,316,941 B2 | 11/2012 | Frenier et al. |
| 2003/0119678 A1 | 6/2003 | Crews |
| 2006/0131022 A1 | 6/2006 | Rae et al. |
| 2007/0235189 A1 | 10/2007 | Milne et al. |
| 2009/0291863 A1 | 11/2009 | Welton et al. |
| 2010/0276152 A1 | 11/2010 | De Wolf et al. |
| 2012/0267112 A1 | 10/2012 | Zhang et al. |
| 2012/0322697 A1 | 12/2012 | Zhang |
| 2013/0213657 A1 | 8/2013 | Dobson, Jr. et al. |
| 2013/0269941 A1 | 10/2013 | Reyes et al. |

(Continued)

FOREIGN PATENT DOCUMENTS

WO 2012127183 A1 9/2012

OTHER PUBLICATIONS

Decomposition of perfluorocarboxylic acids (PFCAs) by heterogeneous photocatalysis in acidic aqueous medium, Sri Chandana Panchangam et. al , Chemosphere 77 (2009) 242-248.*

(Continued)

*Primary Examiner* — Doug Hutton, Jr.
*Assistant Examiner* — Ryan Schneer
(74) *Attorney, Agent, or Firm* — McDermott Will & Emery LLP; Holly Soehnge

(57) ABSTRACT

Methods including providing a treatment fluid comprising a perfluorinated carboxylic acid; introducing the treatment fluid into a subterranean formation having a temperature of at least about 82° C. and having a siliceous material and/or carbonate material therein; and generating hydrofluoric acid from the perfluorinated carboxylic acid; and dissolving at least a portion of the siliceous material with the generated hydrofluoric acid.

20 Claims, 6 Drawing Sheets

(56) References Cited

U.S. PATENT DOCUMENTS

2014/0116696 A1    5/2014  Reyes
2014/0367110 A1*  12/2014  Montgomery et al. .... 166/308.2

OTHER PUBLICATIONS

Efficient Decomposition of Perfluorocarboxylic Acids and Alternative Fluorochemical Surfactants in Hot Water, Hisao Hori et. al Environ. Sci. Technol. (2008), 42, 7438-7443.*

Environ Sci Technol. Dec. 15, 2008;42(24):9283-8, Experimental pKa Determination for Perfluorooctanoic Acid (PFOA) and the Potential Impact of pKa Concentration Dependence on Laboratory-Measured Partitioning Phenomena and Environmental Modeling.

Frontiers of Environmental Science and Engineering, Feb. 2012, vol. 6, Issue 1, pp. 17-25.

Finney et al., Reexamination of Hexafluorosilicate Hydrolysis by 19F NMR and pH Measurement, Environ. Sci. Technol. 2006, 40, pp. 2572-2577.

International Search Report and Written Opinion for PCT/US2013/063888 dated Jul. 24, 2014.

* cited by examiner

TREATMENT FLUIDS CONTAINING A PERFLUORINATED CARBOXYLIC ACID FOR USE IN SUBTERRANEAN FORMATION OPERATIONS

CROSS-REFERENCE TO RELATED APPLICATIONS

This application is a continuation in part of international application PCT/US13/63888, filed on Oct. 8, 2013.

BACKGROUND

The present disclosure generally relates to treatment fluids containing a perfluorinated carboxylic acid for use in subterranean formation operations, and, more specifically, to perfluorinated carboxylic acids capable of, among other things, generating hydrofluoric acid in downhole environments.

Treatment fluids can be used in a variety of subterranean treatment operations. Such treatment operations may include, without limitation, drilling operations, stimulation operations, production operations, remediation operations, sand control treatments, and the like. As used herein, the terms "treat," "treatment," "treating," and grammatical equivalents thereof, refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include fracturing operations, gravel packing operations, acidizing operations, scale dissolution and removal operations, consolidation operations, and the like.

Downhole acidizing operations and other dissolution operations may be used to stimulate a subterranean formation to increase production of a hydrocarbon resource therefrom. During an acidizing operation or a like dissolution operation, an acid-soluble material in the subterranean formation may be dissolved by one or more acids to expand existing flow pathways in the subterranean formation, to create new flow pathways in the subterranean formation, and/or to remove acid-soluble precipitation damage in the subterranean formation, thereby stimulating the formation's production capabilities. Introduction of an acidizing fluid to a subterranean formation may take place at matrix flow rates without fracturing of the formation matrix or at higher injection rates and pressures to fracture the formation. The acid-soluble material being dissolved by the acid(s) may be part of or formed from the native formation matrix or have been deliberately introduced into the subterranean formation in conjunction with a stimulation or like treatment operation (e.g., bridging agents, proppants, or gravel particulates). Illustrative substances within the native formation matrix that may be dissolved by an acid may include, but are not limited to, silicates and aluminosilicates, and carbonates which may be present alone or in combination with one another in formations of mixed mineralogy. Other substances may also be dissolved during the course of performing an acidizing operation, and the foregoing substances should not be considered to limit the scope of substances that may undergo acidization.

Siliceous formations may include minerals such as, for example, zeolites, clays, feldspars, and combinations thereof. As used herein, the term "siliceous" refers to a substance having the characteristics of silica, including silicates and/or aluminosilicates. Among other acids, hydrofluoric acid, a mineral acid, may react very readily with siliceous materials to promote their dissolution. Often, another mineral acid or an organic acid may be used in conjunction with hydrofluoric acid to maintain a low pH state as the hydrofluoric acid becomes spent during dissolution of a siliceous material, where the low pH state helps promote continued solubilization of the siliceous material. Additionally, a chelating agent may often be included with the acid to effectively dissolve the siliceous material, the chelating agent capable of complexing siliceous material for the acid to act upon. Many types of siliceous formations can also contain varying amounts of carbonate materials. Most sandstone formations, for example, contain about 40% to about 98% sand quartz particles (i.e., silica), bonded together by various amounts of cementing materials, which may be siliceous in nature (e.g., aluminosilicates or other silicates) or non-siliceous in nature (e.g., carbonates, such as calcite). When siliceous materials are co-present with carbonate materials, significant precipitation issues can sometimes be encountered, as discussed below.

Carbonate formations may contain minerals that comprise a carbonate anion (e.g., calcite (calcium carbonate), dolomite (calcium magnesium carbonate), siderite (iron carbonate), and the like, and combinations thereof). When acidizing a carbonate formation, the acidity of the treatment fluid alone may often be sufficient to solubilize the carbonate material by decomposing the carbonate anion to carbon dioxide and leeching a metal ion into the treatment fluid. Both mineral acids (e.g., hydrochloric acid) and organic acids (e.g., acetic and formic acids) may be used to treat a carbonate formation, often with similar degrees of success. Since it is relatively inexpensive, hydrochloric acid is very commonly used, typically in concentrations up to about 28% by volume. Like acid dissolution operations in siliceous formations, a chelating agent may often be included with the acid to effectively dissolve carbonate materials in carbonate formations, the chelating agent capable of complexing the carbonate material for the acid to act upon.

In some instances, it can be desirable to remove a carbonate material from a siliceous formation prior to acidizing the siliceous material therein to decrease the occurrence of precipitation in the subterranean formation. For example, calcium ions liberated from the carbonate material can react readily with fluoride ions from hydrofluoric acid to form highly insoluble calcium fluoride, which can often be more damaging to the subterranean formation than if the acidizing operation had not been performed in the first place. Different metal ions liberated from other carbonate materials can also be problematic in this regard. Metal ions liberated from aluminosilicates and other metal-containing siliceous materials may also be problematic in this regard.

Acids are typically included in treatment fluids to perform acidizing operations to dissolve and remove siliceous or carbonate material. The acid may be included prior to introducing the treatment fluid into the formation or on-the-fly during a treatment operation. As used herein, the term "on-the-fly" refers to performing an operation during a subterranean treatment that does not require stopping normal operations. In both instances, the acid must be handled either alone or as part of the treatment fluid. Additionally, in typical acidizing or dissolution treatment operations, the acid functions effectively only at particularly low pH ranges, such as those below about 4, or about 3.5. Often, treatment fluids alone or after being subjected to downhole conditions become more basic in pH. As mentioned earlier, additional acidic fluids may be included to ensure that low pH ranges are achieved. However, such additional acids may increase any operational hazards associated with handling the treatment fluid and acidic components.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
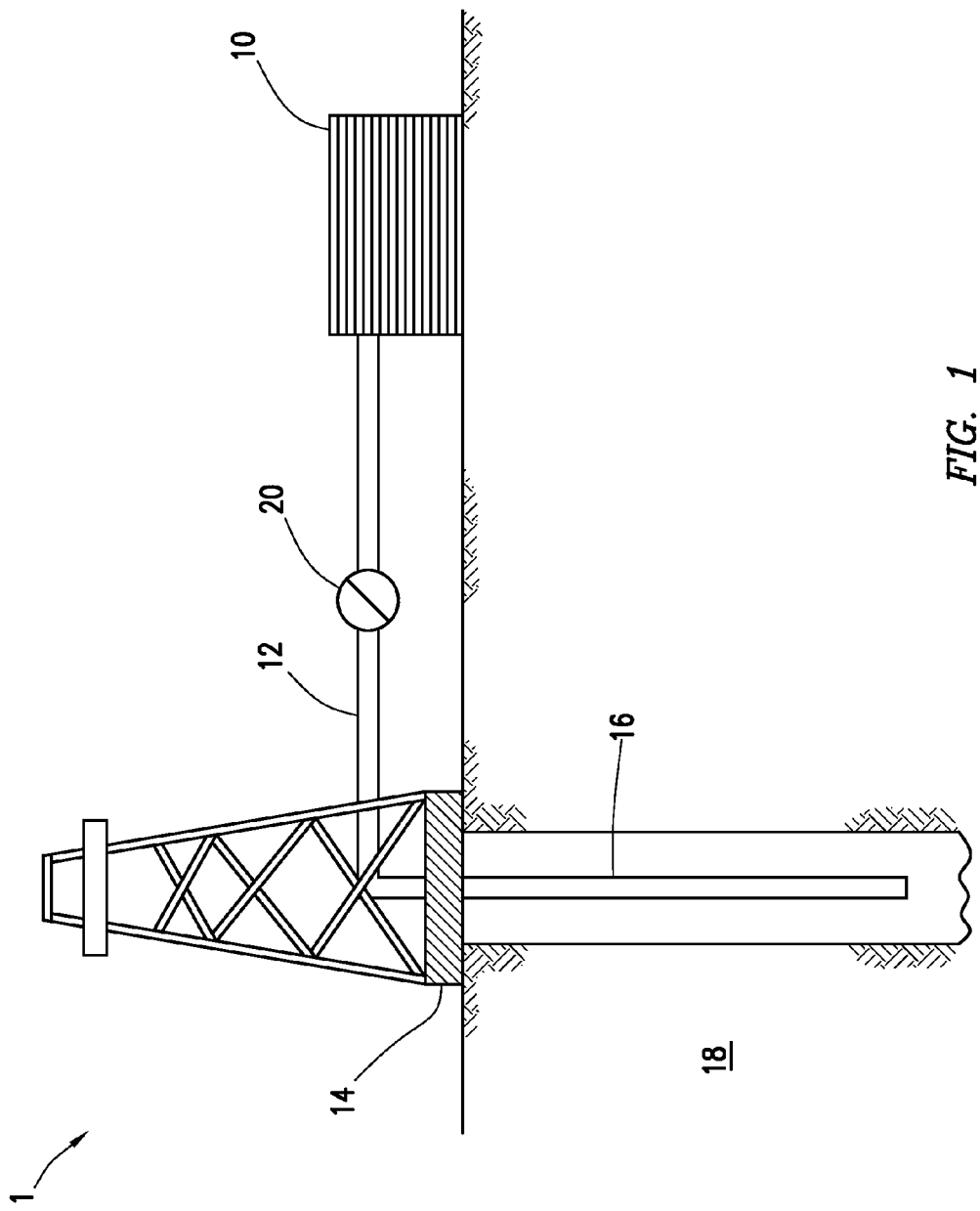
FIG. 1 shows an illustrative schematic of a system that can deliver treatment fluids of the present disclosure to a downhole location.

The present disclosure generally relates to treatment fluids containing a perfluorinated carboxylic acid for use in subterranean formation operations, and, more specifically, to perfluorinated carboxylic acids capable of, among other things, generating hydrofluoric acid in downhole environments.

The perfluorinated carboxylic acids of the present invention may be capable of inclusion in a treatment fluid for use in a subterranean formation, wherein the perfluorinated carboxylic acids are capable of generating hydrofluoric acid at pH ranges of up to about 7 and temperatures above about 82° C. (about 180° F.). In preferred embodiments, the perfluorinated carboxylic acids may generate hydrofluoric acid at pH ranges of up to about 7 and temperatures in the range of a lower limit of about 82° C., 85° C., 90° C., 95° C., 100° C., 105° C., 110° C., 115° C., 120° C., 125° C., 130° C., 135° C., 140° C., 145° C., 150° C., 155° C., 160° C., 165° C., and 170° C. to an upper limit of about 260° C., 255° C., 250° C., 245° C., 240° C., 235° C., 230° C., 225° C., 220° C., 215° C., 210° C., 205° C., 200° C., 195° C., 190° C., 185° C., 180° C., 175° C., and 170° C. (about 180° F. to 500° F.). Such temperature ranges may encompass subterranean formation temperatures such as, for example, geothermal wells, as well as operations performed at high temperatures, such as steam assisted operations implemented for heavy oil (cyclic steam assisted) or tar sands (steam assisted gravity drainage or solvent assisted), for example. Under such conditions, the generation of hydrofluoric acid from the perfluorinated carboxylic acids described herein are capable of effectively dissolving siliceous and carbonate materials alone, without the need of including additional acidic components, chelating agents, or pH control agents, although such constituents may be included without interfering with the ability of the perfluorinated carboxylic acids to generate hydrofluoric acid. The perfluorinated carboxylic acids unexpectedly undergo hydrolysis to form hydrofluoric acid at relatively high temperature, as well as pH ranges.

Generally, the perfluorinated carboxylic acids described herein are capable of forming hydrofluoric acid without the need for a secondary hydrofluoric acid source based on pH, temperature, and exposure time in a treatment fluid, as well as the concentration of the perfluorinated carboxylic acid in the fluid. For example, at higher temperatures, the perfluorinated carboxylic acids may rather readily react to form hydrofluoric acid or may produce a larger percentage of hydrofluoric acid, whereas at lower temperatures, the perfluorinated carboxylic acids may react more slowly to form hydrofluoric acid, thereby requiring additional time exposure to the treatment fluid in order to form a desired amount of hydrofluoric acid. Furthermore, at lower pH ranges, the perfluorinated carboxylic acid may more readily react to form hydrofluoric acid and at higher pH ranges, an increase in the time exposure, for example, may allow for increased concentrations of hydrofluoric acid. The relationship between the formation of hydrofluoric acid and pH, temperature, and time may permit a wellbore operator to tailor a particular treatment operation to achieve certain desired results. For example, in some operations, a delay in the formation of hydrofluoric acid may be desired and achieved by formulating a treatment fluid having a high pH or high temperature. These variables may be manipulated along with the concentration of the perfluorinated carboxylic acid(s) in the treatment fluid, as well.

One or more illustrative embodiments incorporating the disclosure herein are presented below. Not all features of an actual implementation are described or shown in this application for the sake of clarity. It is to be understood that in the development of an actual embodiment incorporating the present disclosure, numerous implementation-specific decisions must be made to achieve the developer's goals, such as compliance with system-related, business-related, government-related and other constraints, which vary by implementation and from time-to-time. While a developer's efforts might be complex and time-consuming, such efforts would be, nevertheless, a routine undertaking for one having ordinary skill in the art and the benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claim, each numerical parameter should at least be construed in light of the number of reported significant digits and by applying ordinary rounding techniques.

The perfluorinated carboxylic acids described herein are effective at generating hydrofluoric acid at temperatures above about 82° C. (about 180° F.) and at elevated pH ranges, as well as acidic pH ranges, without the need to add or handle additional acidic fluids. As used herein, the term "perfluorinated" refers to a compound having two or more fluorine atoms, without reference to the location of the fluorine atoms in the compound's molecular structure. In some embodiments, the term "perfluorinated" refers to an organic compound in which all carbon-hydrogen bonds have been replaced with carbon-fluorine bonds. Without being bound by any theory or mechanism, it is believed that the very high electronegativity of multiple fluorine atoms in such compounds may withdraw electron density from carboxylate anions, thereby stabilizing the anions and facilitating their formation.

The perfluorinated carboxylic acids of the present invention may be perfluorinated monocarboxylic acids, perfluorinated dicarboxylic acids, perfluorinated polycarboxylic acids, and any combination thereof. Such perfluorinated carboxylic acids are more acidic than are their non-fluorinated counterparts, thereby allowing a higher degree of acidity to be attained in a treatment fluid with a lesser amount of carboxylic acid. The perfluorinated carboxylic acids may additionally generate hydrofluoric acid capable of effectively dissolving siliceous and/or carbonate material over a wider range of pH values. In some embodiments, the generated hydrofluoric acid may preferentially be used to dissolve siliceous material.

As used herein, the terms "formation" or "subterranean formation" refer to a body or section of geologic strata, structure, formation or other subsurface solid or collected material that is sufficiently distinctive and continuous with respect to other geologic strata or characteristics that it can be mapped, for example, by seismic techniques. A formation can be a body of geologic strata of predominantly one type or a combination of types, or a fraction of strata having a substantially common set of characteristics. A formation can contain one or more hydrocarbon-bearing zones, or one or more geothermal-reservoir zones. The terms "formation," "subterranean formation," "hydrocarbon-bearing subterranean formation," "geothermal-reservoir zones," "reservoir," and "interval" may be used interchangeably with one another herein, but may generally be used to denote progressively smaller subsurface regions, zones, or volumes. More specifically, a geologic formation may generally be the largest subsurface region, a subterranean formation may generally be a region within the geologic formation and may generally be a hydrocarbon-bearing zone or geothermal-reservoir zone, and an interval may generally refer to a sub-region or portion thereof.

A hydrocarbon-bearing zone can be separated from other hydrocarbon-bearing zones by zones of lower permeability such as mudstones, shales, or shale-like (highly compacted) sands. In one or more embodiments, a hydrocarbon-bearing zone may include heavy oil in addition to sand, clay, or other porous solids. As used herein, the term "hydrocarbons" generally refers to molecules formed primarily from carbon and hydrogen atoms, such as oil and natural gas. In some embodiments, hydrocarbons may be substituted with other elements such as, for example, halogens, metallic elements, nitrogen, oxygen, and/or sulfur. In other embodiments, they may be unsubstituted and contain only carbon and hydrogen. Hydrocarbons may be produced from subterranean formations through wells penetrating a hydrocarbon-containing formation. Hydrocarbons derived from a hydrocarbon-bearing subterranean formation may include, but are not limited to, kerogen, bitumen, pyrobitumen, asphaltic or tar oil, crude oils, natural gases, and any combination thereof. Hydrocarbons may be located within or adjacent to mineral matrices within the earth. Mineral matrices may include, but are not limited to, sedimentary rock, sands, silicilytes, carbonates, diatomites, and other porous media.

A geothermal-reservoir zone may be a portion of a subterranean formation that produces geothermal energy (i.e., thermal energy generated and stored in the earth formation). The geothermal energy may be created by the slow decay of radioactive materials, such as uranium, or tectonic plate movement, for example. Such geothermal energy may be produced to the surface in the form of steam.

In various embodiments, treatment fluids containing a perfluorinated carboxylic acid and methods for use thereof are described herein. In some embodiments, the treatment fluids described herein can comprise a perfluorinated carboxylic acid having one or at least two carboxylic acid groups. Further disclosure regarding suitable perfluorinated carboxylic acids follows hereinbelow.

In some embodiments, the treatment fluids described herein may comprise an aqueous carrier fluid as their continuous phase. Suitable aqueous carrier fluids may include, for example, fresh water, acidified water, salt water, seawater, brine (e.g., a saturated salt solution), or an aqueous salt solution (e.g., a non-saturated salt solution). Aqueous carrier fluids may be obtained from any suitable source. Given the benefit of the present disclosure, one of ordinary skill in the art will be able to determine a suitable aqueous carrier fluid for utilization in the embodiments described herein.

In some embodiments, an organic co-solvent may be included with an aqueous carrier fluid containing a perfluorinated carboxylic acid. Suitable organic co-solvents may include, but are not limited to, glycols and alcohol solvents, for example. When present, the amount of the organic co-solvent may range from a lower limit of about 1%, 2%, 4%, 6%, 8%, 10%, 12%, 14%, 16%, 18%, 20%, 22%, 24%, and 26% to an upper limit of about 50%, 48%, 46%, 44%, 42%, 40%, 38%, 36%, 34%, 32%, 30%, 28%, and 26% by volume of the treatment fluid. Considerations for including an organic co-solvent may include, for example, the solubility of the perfluorinated carboxylic acid or other treatment fluid component in an aqueous carrier fluid.

In other various embodiments, the treatment fluids described herein may comprise an oleaginous carrier fluid as their continuous phase. Suitable oleaginous carrier fluids may include, for example, an organic solvent, a hydrocarbon, oil, a refined component of oil, or any combination thereof. Oleaginous carrier fluids may be utilized when the perfluorinated carboxylic acid or another treatment fluid component is not sufficiently soluble in an aqueous carrier fluid.

In some embodiments, the treatment fluids described herein may further comprise a surfactant that increases the miscibility of the perfluorinated carboxylic acid with the carrier fluid. Suitable surfactants are not believed to be particularly limited and may comprise cationic, anionic, zwitterionic, and/or neutral surfactants. When present, an amount of the surfactant in the treatment fluid may be less than about 10%, 9.5%, 9%, 8.5%, 8%, 7.5%, 7%, 6.5%, 6%, 5.5%, 5%, 4.5%, 4%, 3.5%, 3%, 2.5%, 2%, 1.5%, 1%, 0.5%, and 0.1% by weight of the treatment fluid, with a typical range of between about 0.5% to about 5% by weight of the treatment fluid being used.

In various embodiments, the treatment fluids described herein may comprise a perfluorinated carboxylic acid and may be a perfluorinated monocarboxylic acid or a perfluorinated dicarboxylic acid (i.e., having a difluorinated methylene group adjacent to each carboxylic acid group). Combinations of these may also be used. In some embodiments, additional fluorination may be present in the perfluorinated carboxylic acid. In some embodiments, the perfluorinated carboxylic acid may comprise one or more ether functionalities in a perfluorinated carbon chain linking the carboxylic acid groups to one another. The perfluorinated carboxylic acids suitable for use in generating hydrofluoric acid in the treatment fluids described herein may generally have the formula $C_nF_{(2n+1)}CO_2H$, wherein n is an integer between about 1 and about 20, encompassing any value therebetween. Examples of specific perfluorinated carboxylic acids suitable for use in the embodiments described herein may include, but are not limited to, perfluorosuccinic acid, perfluoroglutaric acid, perfluoro-3,6-dioxaheptanoic acid, perfluorohexanoic acid, perfluoroadipic acid, perfluoro-3,6-dioxaoctane-1,8-dioic acid, perfluoroheptanoic acid, perfluoro-3,6,9-trioxadecanoic acid, perfluorooctanoic acid, perfluorosuberic acid, perfluoro-3,6-dioxadecanoic acid, perfluoro-3,6,9-trioxaundecane-1,11-dioic acid, perfluorononanoic acid, perfluoro-3,5,5-trimethylhexanoic acid, perfluoroazelaic acid, perfluorodecanoic acid, perfluoro-3,7-dimethyloctanoic acid, perfluorosebacic acid, perfluoro-3,6,9-trioxatridecanoic acid, perfluoroundecanoic acid, perfluorododecanoic acid, perfluorododecanedioic acid, perfluorotetradeconoic acid, perfluorohexadecanoic acid, and any combination thereof. Other suitable perfluorinated carboxylic acids, including those not commercially available, may be envisioned by one having ordinary skill in the art. Moreover, one having ordinary skill in the art will recognize suitable techniques for synthesizing such perfluorinated carboxylic acids.

In some embodiments, the perfluorinated carboxylic acid(s) may be present in the treatment fluids of the present disclosure in an amount in the range of from a lower limit of about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, and 30% to an upper limit of about 50%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, and 30% by weight per volume ("w/v") of the treatment fluid. As is shown below, with reference to the Examples provided herein, the amount of perfluorinated carboxylic acid used in the treatment fluids of the present disclosure may be, among other things, particularly temperature dependent. For example, at high temperatures, a lesser amount of the perfluorinated carboxylic acid may be required (e.g., at temperatures above about 149° C. (300° F.), a lower limit of about 5% w/v of the perfluorinated carboxylic acid may be used in the treatment fluid). On the other hand, at low temperatures, an increased amount of perfluorinated carboxylic acid may be preferred to achieve the desired hydrofluoric acid amount (e.g., at temperatures between about 82° C. (180° F.) and about 149° C. (300° F.), a lower limit of about 20% w/v of the perfluorinated carboxylic acid may be used in the treatment fluid). One of ordinary skill, with the benefit of this disclosure will recognize the amount of perfluorinated carboxylic acid to include in a treatment fluid for use in a particular subterranean formation operation based on, at least, the temperature of that operation.

In some embodiments, the treatment fluids described herein may further comprise a chelating agent, which may be singly fluorinated and water-soluble, for example. The chelating agent may be complex metal ion at the pH values of the treatment fluids (i.e., below about 7). The nature of the chelating agent is not believed to be particularly limited in scope. In some embodiments, the chelating agent may comprise an aminopolycarboxylic acid, a number of which are biodegradable at least to some degree. As used herein, the term "aminopolycarboxylic acid" refers to a compound having one or more amino groups and two or more carboxylic acid groups. Suitable aminopolycarboxylic acid chelating agents having some measure of biodegradability may include, but are not limited to, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxyl)ethyl]glycine (BCA6), N-bis[2-(1,2-dicarboxyethoxyl)ethyl]aspartic acid (BCA5), N-bis[2-(1,2-dicarboxyethoxyl)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N"-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N, N-diacetic acid, aspartic acid-N-monoacetic acid, any salt thereof, any derivative thereof, and any combination thereof. Particularly suitable biodegradable chelating agents that may be used in the treatment fluids described herein include, for example, MGDA, GLDA, EDDS, β-ADA, IDS, TCA6, BCA3, BCA5, BCA6, MCBA3, and MCBA5.

In some embodiments, as an alternative to aminopolycarboxylic acid chelating agents, traditional chelating agents such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, citric acid, any salt thereof, any derivative thereof, or the like may be included in the treatment fluids described herein as the chelating agent. In some or other alternative embodiments, suitable chelating agents that may include hydroxamates and pyridinecarboxylic acids. Combinations of any of the chelating agents described herein may also be suitable for use in the treatment fluids of the present disclosure.

In general, the concentration of chelating agent in the treatment fluids may be dictated by the quantity of metal ions needing sequestration in the course of conducting a particular treatment operation, as well as the solubility of the chelating agent(s) in the treatment fluid. In various embodiments, a concentration of chelating agent in the treatment fluid may range of a lower limit of about 0.1%, 0.5%, 1%, 2%, 3%, 4%, 5%, 6%, 7%, 8%, 9%, and 10% to an upper limit of about 20%, 19%, 18%, 17%, 16%, 15%, 14%, 13%, 12%, 11%, and 1% by weight of the treatment fluid. In other embodiments, a concentration of the chelating agent in the treatment fluid may range between about 1% to about 15% by weight of the treatment fluid, or between about 1% to about 5% by weight of the treatment fluid, or between about 1% to about 10% by weight of the treatment fluid, or between about 5% to about 10% by weight of the treatment fluid, or between about 5% to about 15% by weight of the treatment fluid.

In some embodiments, the treatment fluids described herein may be acid-free other than the carboxylic acid groups that are present on the perfluorinated carboxylic acid for use in generating hydrofluoric acid. That is, in some embodiments, the treatment fluids may contain no other acids or acid-generating compounds. When no additional acids are present, the perfluorinated carboxylic acid(s) may interact alone and generate an acid (i.e., hydrofluoric acid) capable of dissolving at least a portion of siliceous or carbonate material present in a subterranean formation. The dissolved carbonate material may be in the form of soluble fluorocarboxylate material.

In other embodiments, the treatment fluids described herein may further comprise another acid or acid-generating compound in addition to the carboxylic acid groups present on the perfluorinated carboxylic acid(s). Inclusion of an additional acid in the treatment fluids may result in a more vigorous dissolution of a siliceous or carbonate material than is promoted by the perfluorinated carboxylic acid alone. When an additional acid is present, the treatment fluids may comprise a mineral acid or an organic acid. Suitable mineral acids may include, but are not limited to, hydrochloric acid, hydrofluoric acid, and hydrobromic acid. Suitable organic acids may include, but are not limited to, formic acid, acetic acid, methanesulfonic acid, chloroacetic acid, dichloroacetic acid, trichloroacetic acid, fluoroacetic acid, difluoroacetic acid, trifluoroacetic acid, and any combination thereof. Acid-generating compounds may also be used in the treatment fluids in a comparable manner. Examples of suitable acid-generating compounds that may be used in some embodiments described herein include, for example, esters, aliphatic polyesters, orthoesters, poly(orthoesters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, and formate esters of pentaerythritol. Compounds capable of generating these acids may also be used. Moreover, combinations of these acids or acid-generating compounds may also be suitable for use as an additional acid in the treatment fluids comprising the perfluorinated carboxylic acids described herein.

In various embodiments, the amount of additional acid in the treatment fluids described herein may range from a lower limit of about 1%, 2%, 3%, 4%, 5%, 6%, 7%, 8%, 9%, and 10% to an upper limit of about 20%, 19%, 18%, 17%, 16%, 15%, 14%, 13%, 12%, 11%, and 10% of the treatment fluid by weight. In other embodiments, the amount of additional acid in the treatment fluids may range from about 1% to about 10% of the treatment fluid by weight.

The treatment fluids described herein can exhibit a wide range of initial pH values. The pH of the treatment fluids may be influenced by factors including, for example, the concentration of the perfluorinated carboxylic acid or any additional acid(s) that may be present. In some embodiments, to effectively generate hydrofluoric acid from the perfluorinated carboxylic acid in the treatment fluid, the treatment fluid has a pH of less than about 7. In some embodiments, the treatment fluid may have a pH of between about 7 and 4, or less.

In additional embodiments, the treatment fluids described herein may further comprise any number of additives that are commonly used in downhole operations including, for example, a silica scale control additive, a surfactant, a gel stabilizer, an anti-oxidant, a polymer degradation prevention additive, a relative permeability modifier, a scale inhibitor, a corrosion inhibitor, a foaming agent, a defoaming agent, an antifoaming agent, an emulsifying agent, a de-emulsifying agent, an iron control agent, a proppant, a particulate, a particulate diverter, a salt, a fluid loss control additive, a gas, a catalyst, a clay control agent, a dispersant, a scavenger, a gelling agent, a lubricant, a breaker, a friction reducer, a bridging agent, a viscosifier, a weighting agent, a solubilizer, a pH control agent, a hydrate inhibitor, a consolidating agent, a bactericide, a delayed release breaker, and any combination thereof. Given the benefit of the present disclosure, one of ordinary skill in the art will be able to formulate a treatment fluid having properties suitable for a given application.

In some embodiments, the treatment fluids described herein can be introduced to a subterranean formation below a fracture gradient pressure of the subterranean formation. In other embodiments, the treatment fluids described herein can be introduced to a subterranean formation at or above a fracture gradient pressure of the subterranean formation, such that one or more fractures are created or enhanced in the subterranean formation as a result of the treatment. Given the benefit of the present disclosure and the understanding of one having ordinary skill in the art, one can readily determine whether to introduce the treatment fluids to a subterranean formation at matrix flow rates (i.e., below the fracture gradient pressure) or at fracturing flow rates (i.e., at or above the fracture gradient pressure).

As used herein, the term "fracture gradient pressure" refers to an equivalent fluid pressure sufficient to create or enhance one or more fractures in the subterranean formation. As used herein, the "fracture gradient pressure" of a layered formation also encompasses a parting fluid pressure sufficient to separate one or more adjacent bedding planes in a layered formation. It should be understood that one of ordinary skill in the art may perform a simple leak-off test on a core sample of a formation to determine the fracture gradient pressure of a particular formation.

As used herein, the term "fracture" refers to a crack, delamination, surface breakage, separation, crushing, rubblization, or other destruction within a geologic formation or fraction of formation not related to foliation or cleavage in metamorphic formation, along which there has been displacement or movement relative to an adjacent portion of the formation. A fracture along which there has been lateral displacement may be termed a fault.

When walls of a fracture have moved only normal to each other, the fracture may be termed a joint. Fractures may enhance permeability of rocks greatly by connecting pores together, and for that reason, joints and faults may be induced mechanically in some reservoirs in order to increase fluid flow.

In various embodiments, the subterranean formation may comprise a carbonate material that may be dissolved by the hydrofluoric acid generated by the perfluorinated carboxylic acid in the treatment fluids herein. The carbonate material may occur natively in the subterranean formation, or it can have been introduced to the subterranean formation in the course of performing a treatment operation. In some embodiments, the subterranean formation can comprise a carbonate material such as calcite, dolomite, or siderite, or any combination thereof. The carbonate material may further comprise calcium ions, magnesium ions, iron ions, and any combination thereof. In some embodiments, the subterranean formation may comprise a carbonate formation such as, for example, a chalk formation or a limestone formation. In other embodiments, the subterranean formation may comprise a mixed mineralogy, such as a mixture of a siliceous material and a carbonate material.

Similarly, in some embodiments, the methods described herein may further comprise dissolving a siliceous material in the subterranean formation with the generated hydrofluoric acid from the perfluorinated carboxylic acids described herein. The dissolved siliceous material may be in the form of soluble fluorosilicate material. In some embodiments, the siliceous material may be silica, diatomite, and any combination thereof. The siliceous material may further comprise aluminum ions, calcium ions, iron ions, potassium ions, sodium ions, and any combination thereof.

In other various embodiments, systems configured for delivering the treatment fluids described herein to a downhole location are described. In various embodiments, the systems can comprise a pump fluidly coupled to a tubular, the tubular containing a treatment fluid comprising a perfluorinated carboxylic acid.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Tubular 16 may include orifices that allow the fluid to enter into the subterranean formation. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18. In other embodiments, the treatment fluid may flow back to wellhead 14 in a produced hydrocarbon fluid from the subterranean formation.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

In various embodiments, the treatment fluids described herein may be used in conjunction with a stimulation operation conducted in a subterranean formation. The treatment fluids may be delivered downhole using the illustrative systems described hereinabove. In some embodiments, the stimulation operation can comprise a fracturing operation. In some or other embodiments, the stimulation operation can comprise an acidizing operation. In some embodiments, the treatment fluids described herein may be used in conjunction with a remediation operation conducted in a subterranean formation.

In some embodiments, the treatment fluids may be used to remediate a subterranean formation that has precipitation or accumulation damage therein. As used herein, the term "precipitation" or "accumulation damage" refers to a material that has been dissolved in a subterranean formation and deposited elsewhere within the subterranean formation, optionally after undergoing a further reaction. That is, the treatment fluids described herein may be used to dissolve the various components of such damage in order to increase the permeability of the subterranean formation, thereby leading to the possibility of increased production. The precipitation or accumulation damage in the subterranean formation may result from any source, such as those discussed herein, which may include another treatment operation.

In some embodiments, the treatment fluids described herein may be used in conjunction with drilling a wellbore penetrating a subterranean formation. For example, when used during drilling, the treatment fluids may desirably leave the subterranean formation conditioned with perfluorinated carboxylic acid so that precipitation can be subsequently mitigated at a later time. It is to be recognized, however, that the treatment fluids may also be used for proactive treatment of a subterranean formation at points in time other than in the drilling stage.

Embodiments herein include:

A. A method comprising: providing a treatment fluid comprising a perfluorinated carboxylic acid; introducing the treatment fluid into a subterranean formation having a temperature of at least about 82° C. and having a siliceous material therein; and generating hydrofluoric acid from the perfluorinated carboxylic acid; and dissolving at least a portion of the siliceous material with the generated hydrofluoric acid.

B. A method comprising: providing a treatment fluid comprising a perfluorinated carboxylic acid; introducing the treatment fluid into a subterranean formation having a temperature of at least about 82° C. and having a carbonate material therein; generating hydrofluoric acid from the perfluorinated carboxylic acid; and dissolving at least a portion of the carbonate material with the generated hydrofluoric acid.

Each of embodiments A and B may have one or more of the following additional elements in combination:

Element 1: Wherein the siliceous material is selected from the group consisting of silica, diatomite, aluminum ions, calcium ions, iron ions, potassium ions, sodium ions, and any combination thereof.

Element 2: Wherein the carbonate material is selected from the group consisting of calcite, dolomite, siderite, calcium ions, magnesium ions, iron ions, and any combination thereof.

Element 3: Wherein the treatment fluid contains no other acids or acid-generating compounds.

Element 4: Wherein the perfluorinated carboxylic acid has a formula of $C_nF_{(2n+1)}CO_2H$, wherein n is an integer between 1 and 20.

Element 5: Wherein the perfluorinated carboxylic acid is selected from the group consisting of perfluorosuccinic acid, perfluoroglutaric acid, perfluoro-3,6-dioxaheptanoic acid, perfluorohexanoic acid, perfluoroadipic acid, perfluoro-3,6-dioxaoctane-1,8-dioic acid, perfluoroheptanoic acid, perfluoro-3,6,9-trioxadecanoic acid, perfluorooctanoic acid, perfluorosuberic acid, perfluoro-3,6-dioxadecanoic acid, perfluoro-3,6,9-trioxaundecane-1,11-dioic acid, perfluorononanoic acid, perfluoro-3,5,5-trimethylhexanoic acid, perfluoroazelaic acid, perfluorodecanoic acid, perfluoro-3,7-dimethyloctanoic acid, perfluorosebacic acid, perfluoro-3,6,9-trioxatridecanoic acid, perfluoroundecanoic acid, perfluorododecanoic acid, perfluorododecanedioic acid, perfluorotetradeconoic acid, perfluorohexadecanoic acid, and any combination thereof.

Element 6: Wherein the treatment fluid has an initial pH of less than about 7.

Element 7: Wherein the treatment fluid further comprises an additive selected from the group consisting of a silica scale control additive, a surfactant, a gel stabilizer, an anti-oxidant, a polymer degradation prevention additive, a relative permeability modifier, a scale inhibitor, a corrosion inhibitor, a foaming agent, a defoaming agent, an antifoaming agent, an emulsifying agent, a de-emulsifying agent, an iron control agent, a proppant, a particulate, a particulate diverter, a salt, a fluid loss control additive, a gas, a catalyst, a clay control agent, a dispersant, a scavenger, a gelling agent, a lubricant, a breaker, a friction reducer, a bridging agent, a viscosifier, a weighting agent, a solubilizer, a pH control agent, a hydrate inhibitor, a consolidating agent, a bactericide, a delayed release breaker, and any combination thereof.

Element 8: Wherein the treatment fluid further comprises an aqueous carrier fluid or an oleaginous carrier fluid.

Element 9: Wherein the treatment fluid is introduced into the subterranean formation above a fracture gradient pressure of the subterranean formation or below the fracture gradient pressure of the subterranean formation.

Element 10: Further comprising a wellhead with a tubular extending therefrom and into the subterranean formation, and a pump fluidly coupled to the tubular, wherein the step of: introducing the treatment fluid into the subterranean formation comprises introducing the treatment fluid through the wellbore.

By way of non-limiting example, exemplary combinations of A and B may include: A with 1 and 9; A with 6 and 7; A with 3 and 10; B with 2 and 8; B with 5 and 9; B with 4.

To facilitate a better understanding of the embodiments of the present disclosure, the following examples of preferred or representative embodiments are given. In no way should the following examples be read to limit, or to define, the scope of the disclosure.

EXAMPLES

Examples 1 and 2

Dissolution of a Sandstone Core with a Treatment Fluid Containing Hexafluoroglutaric Acid ("HFGA") and Ammonium Bifluoride Example 1: A sandstone core was flooded at 180° F. (82° C.) with an aqueous treatment fluid containing 5% HFGA by weight and 8.5% ammonium bifluoride by weight (corresponding to 6% hydrofluoric acid by weight). The treatment fluid had an initial pH of 4.25 and also contained 0.2% surfactant by weight. Elution fractions were then periodically collected and analyzed for the concentrations of various metal ions using ICP. Metal ion concentrations and the pH values of the elution fractions are shown in Table 1.

TABLE 1

| Sample Number | Al (ppm) | Fe (ppm) | K (ppm) | Si (ppm) | pH |
|---|---|---|---|---|---|
| A | 41.1 | 1069 | 195 | 7273 | 5.96 |
| B | 10.2 | 649 | 64 | 7888 | 6.03 |
| C | 2.5 | 461 | 54 | 8279 | 5.96 |
| D | 14.0 | 423 | 48 | 8734 | 5.95 |
| E | 10.4 | 338 | 48 | 8603 | 5.96 |
| F | 39.9 | 630 | 340 | 4352 | 5.71 |
| G | 309.8 | 81 | 132 | 540 | 3.97 |

Figure 2:
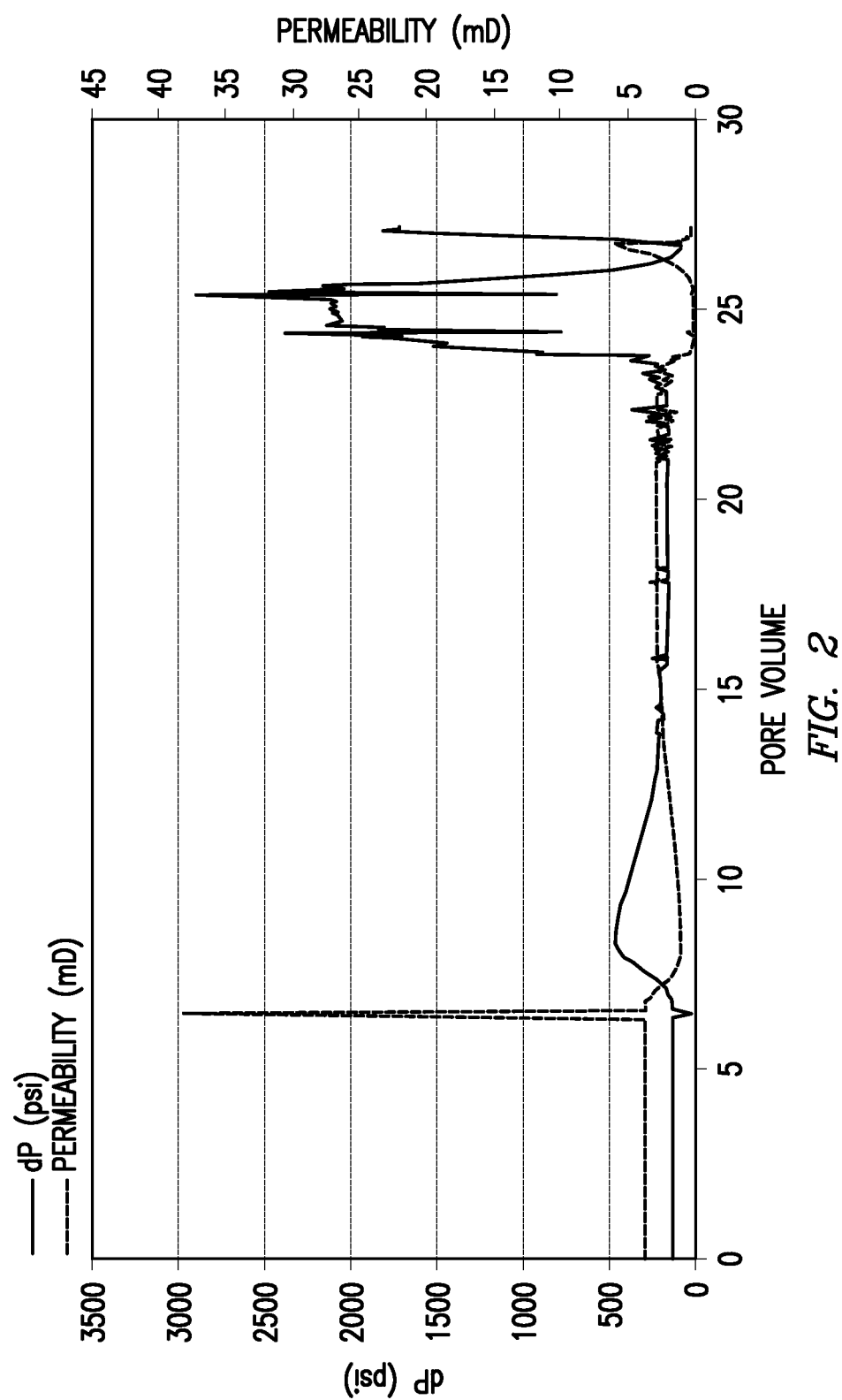
FIGS. 2-4 show illustrative plots of differential pressure and permeability as a function of pore volume in a sandstone core.
Figure 3:
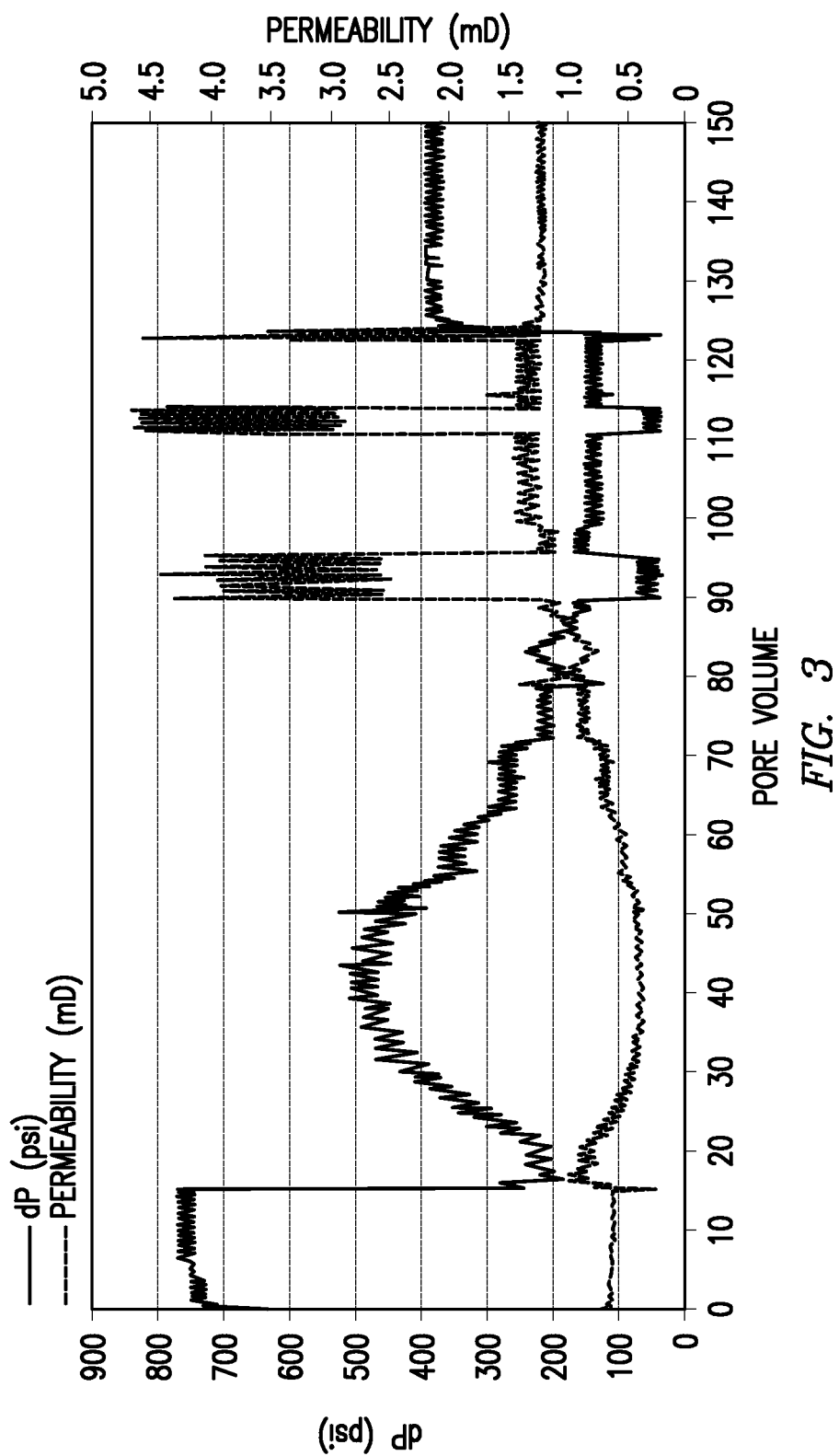

As shown in Table 1, high concentrations of dissolved silicon were maintained in the elution fractions, even in the presence of metal ions that can form precipitates in the presence of dissolved silicon, particularly at high pH values such as those obtained. Retesting of the elution fractions after standing for 3 days did not result in a significant change in the testing values. FIG. 2 shows an illustrative plot of differential pressure and permeability as a function of pore volume in the sandstone core. As shown, the permeability decreased, likely due to the high concentration of hydrofluoric acid that was present. Example 2: Testing was repeated as in Example 1, except the treatment fluid composition was the following: 1% HFGA by weight, 1.7% ammonium bifluoride by weight (corresponding to 1.2% hydrofluoric acid by weight), and 0.04% surfactant by weight. The pH remained 4.25. Metal ion concentrations and pH values of the elution fractions are summarized in Table 2. FIG. 3 shows an illustrative plot of differential pressure and permeability as a function of pore volume in the sandstone core.

TABLE 2

| Sample Number | Al (ppm) | Fe (ppm) | K (ppm) | Si (ppm) | pH |
|---|---|---|---|---|---|
| A | 729 | 509 | 195 | 1483 | 4.02 |
| B | 691 | 445 | 203 | 1512 | 3.93 |
| C | 713 | 416 | 227 | 1602 | 3.88 |
| D | 719 | 379 | 249 | 1665 | 3.94 |
| E | 687 | 341 | 260 | 1698 | 3.79 |
| F | 301 | 197 | 128 | 619 | 3.91 |
| G | 78 | 84 | 39 | 177 | 4.08 |
| H | 27 | 25 | 19 | 36 | 4.17 |

As shown in Table 2, high concentrations of dissolved silicon were again attained. Unlike Example 1, however, the permeability did not decrease in this Example, as shown in FIG. 3. It is believed that the superior permeability behavior of this example is due to the lower effective concentration of hydrofluoric acid, which is more consistent with that used in typical sandstone acidizing treatments.

Example 3

Figure 4:
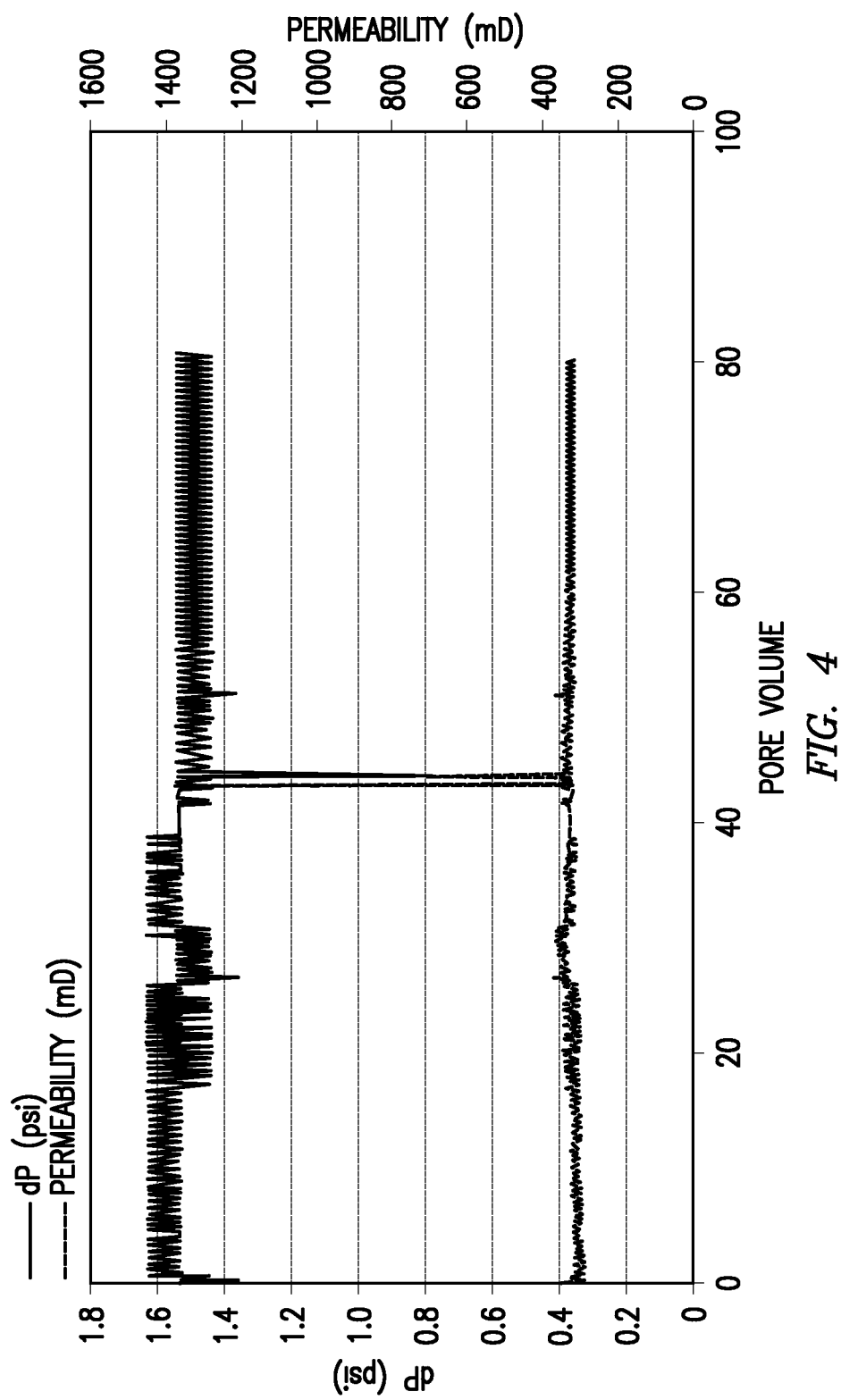

Treatment of a Sandstone Core with a Treatment Fluid Containing 10% Hexafluoroglutaric Acid Only A sandstone core was flooded at 180° F. (82° C.) with a treatment fluid containing 10% HFGA by weight and 0.2% surfactant. The treatment fluid had a pH of 4.25. Metal ion concentrations and pH values of the elution fractions are summarized in Table 3. FIG. 4 shows an illustrative plot of differential pressure and permeability as a function of pore volume in the sandstone core.

TABLE 3

| Sample Number | Al (ppm) | Fe (ppm) | K (ppm) | Si (ppm) | pH |
|---|---|---|---|---|---|
| A | 1.2 | 1.8 | 32.6 | 7.4 | 7.54 |
| B | 1.2 | 0.9 | 21.5 | 5.0 | 7.67 |
| C | 1.0 | 0.8 | 19.2 | 4.8 | 7.74 |
| D | 0.9 | 0.7 | 15.6 | 4.5 | 7.70 |
| E | 0.8 | 0.7 | 14.5 | 4.4 | 7.71 |
| F | 0.8 | 0.7 | 14.1 | 4.3 | 7.75 |
| G | 0.9 | 0.8 | 17.4 | 4.3 | 7.76 |
| H | 0.8 | 0.7 | 12.8 | 4.2 | 7.77 |
| I | 0.8 | 0.6 | 12.0 | 4.2 | 7.75 |
| J | 0.8 | 0.7 | 11.6 | 4.0 | 7.76 |
| K | 0.8 | 0.6 | 11.7 | 4.1 | 7.79 |
| L | 1.0 | 0.9 | 11.8 | 3.8 | 7.72 |

As shown in Table 3, very little dissolution occurred. FIG. 4 likewise shows that essentially no change in permeability occurred due to lack of dissolution of the core.

Example 4

Treatment of Geothermal Silica Scale with a Treatment Fluid Containing 20% Hexafluoroglutaric Acid Only In this example, a sample of geothermal silica scale was treated with an aqueous treatment fluid comprising 20% HFGA without additional sources of hydrofluoric acid. The geothermal silica scale contained primarily quartz, iron oxide, copper oxide, and secondary phases of antimony and silver minerals, in the native formation matrix. The geothermal silica scale and treatment fluid were placed in a Hastelloy C reactor, pressurized to 500 psi, and heated at 5° C./minute to the target temperature and maintained for a designated time period at the target temperature. The geothermal silica scale sample was weighed before and after the test period to determine the percent amount of dissolved silica upon exposure to the treatment fluid. The treatment fluid composition, test parameters, and dissolution values are provided in Table 4 below.

TABLE 4

| Sample Number | Fluid | Temp. | Test Duration | Initial Mass of Scale | Final Mass of Scale | % Dissolved |
|---|---|---|---|---|---|---|
| A | 50 mL HFGA (20% w/v) | 350° F. (177° C.) | 8 hours | 1.06 g | 0.56 g | 46.9% |
| B | 50 mL HFGA (20% w/v) | 180° F. (82° C.) | 4 hours | 0.91 g | 0.60 g | 34.5% |

As shown in Table 4, the treatment fluid comprising 20% HFGA alone is capable of dissolving siliceous material. Table 4 similarly demonstrates that at increased temperatures and durations, increased dissolution of the siliceous material may be attained. The treatment fluid, as prepared, had an initial pH of less than 0.5. However, the pH of the treatment fluid post-testing had increased pH values, signifying the consumption of the proton species during the course of the reaction period. The treatment fluid post-testing was analyzed for the concentrations of various metal ions using ICP. The pH values and metal ion concentrations are shown in Table 5, where the symbol "-" indicates that the particular metal ion was not analyzed.

TABLE 5

| Sample Number | Al (ppm) | Ca (ppm) | Fe (ppm) | K (ppm) | Mg (ppm) | Na (ppm) | Si (ppm) | pH |
|---|---|---|---|---|---|---|---|---|
| A | 51.3 | 7.4 | 1275 | — | — | 93.4 | 1097 | 2.8 |
| B | 30.7 | 286.8 | 1869 | 21.5 | 17.8 | 115.5 | 174 | 0.8 |

As shown in Table 5, temperature (and duration) may be particularly significant for formation of HF and amount of dissolution of siliceous material without the use of other sources of hydrofluoric acid. At 180° F./82° C. at 20% HFGA, some dissolution occurred. At the higher temperature of 350° F./177° C., nearly 47% dissolution occurred, as shown in Table 4 for Sample A. This significant dissolution is corroborated by the dissolved silicon concentration of 1097 ppm, as shown in Table 5.

Example 5

Formation of Hydrofluoric Acid with 20% Hexafluoroglutaric Acid Only

Figure 5:
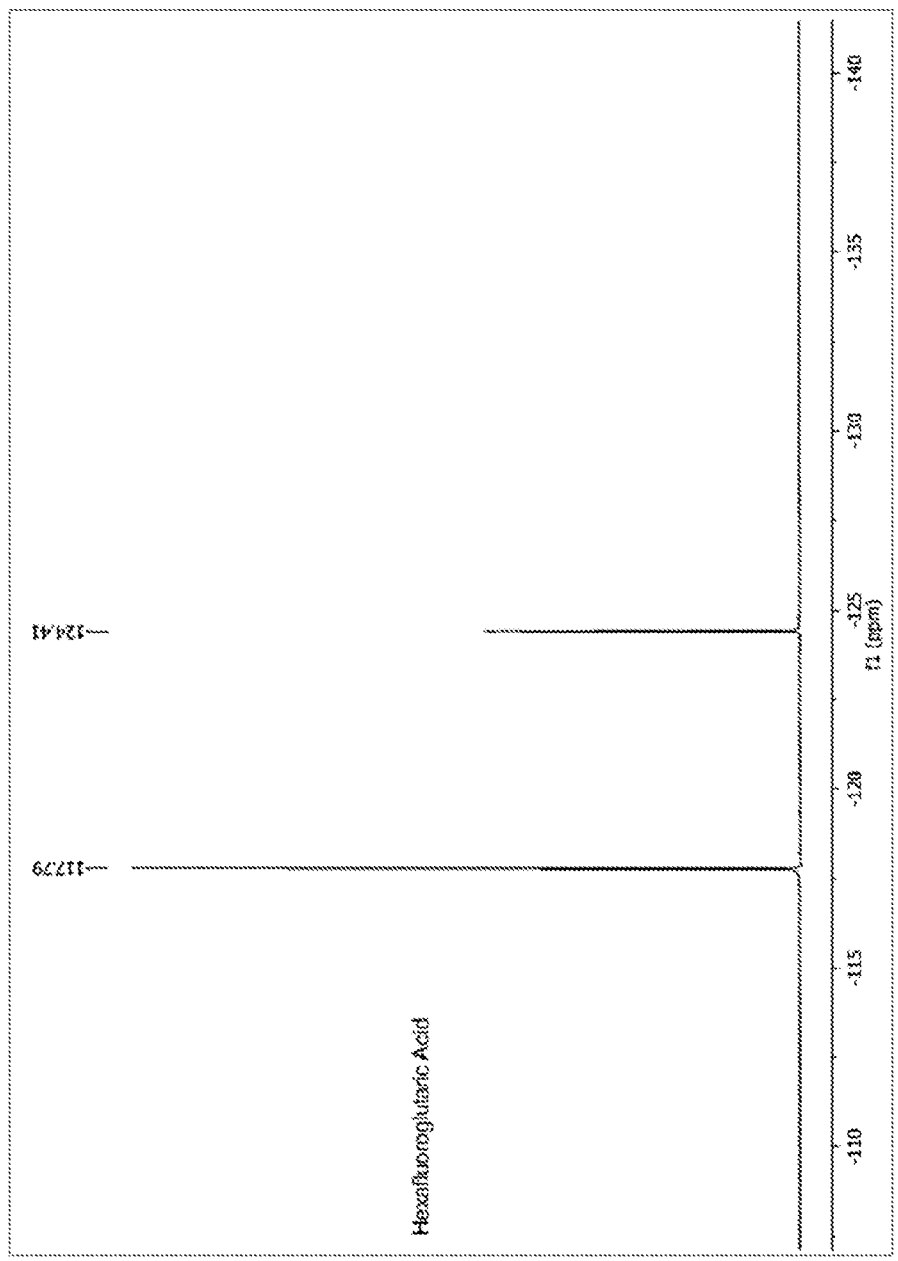
FIGS. 5-6 show illustrative fluorine-19 nuclear magnetic resonance ("19-F NMR") spectrums.
Figure 6:
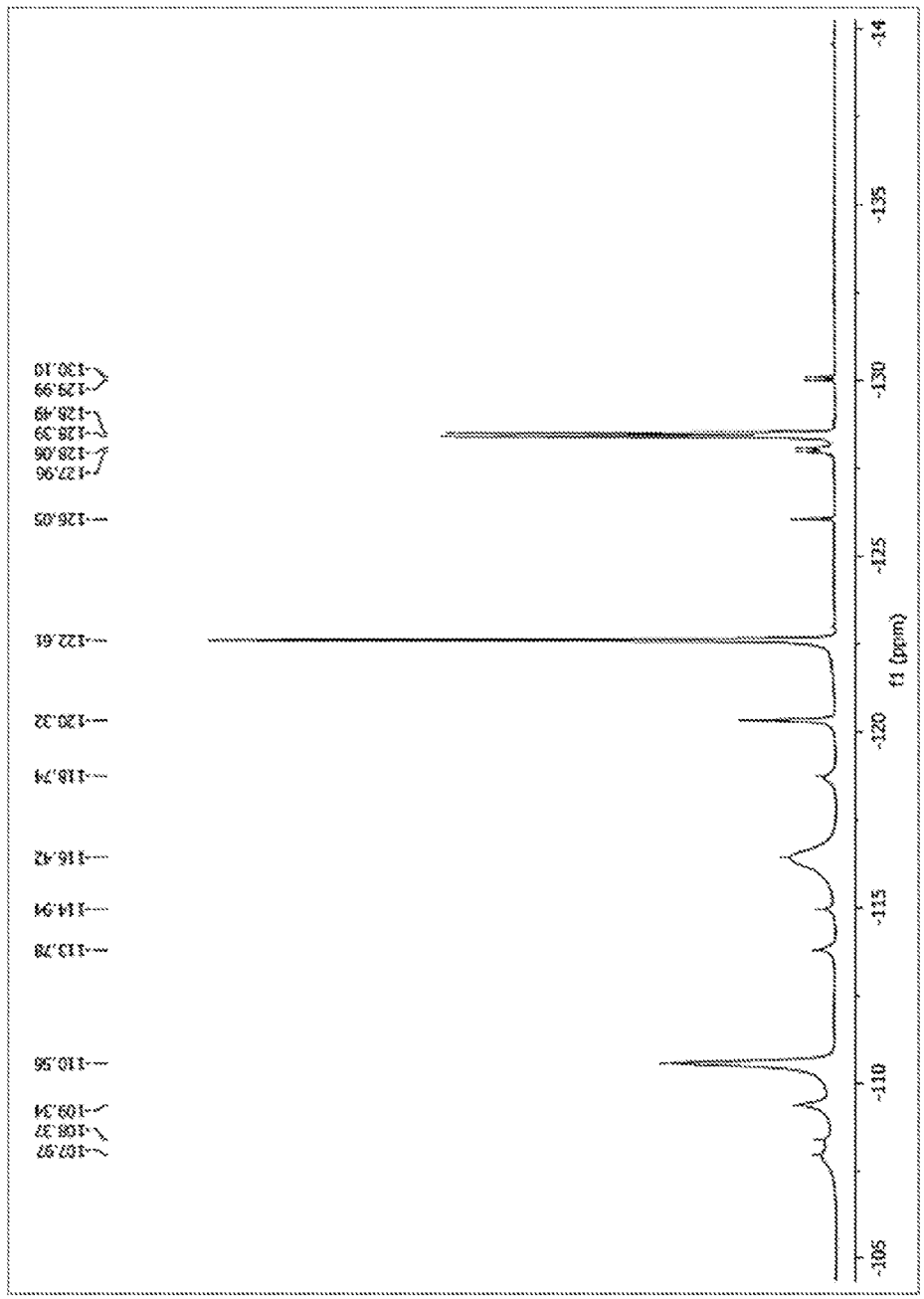

The formation of hydrofluoric acid was analyzed using fluorine-19 NMR ("F19 NMR"). Referring now to FIG. 5, a F19 NMR spectrum for an aqueous treatment fluid comprising 10% HFGA is shown. The spectrum is composed of two signals in a 2:1 ratio, resonating at −117 ppm and −124 ppm (using a reference of NaF 0.01M, chemical shift −119 ppm). The lower field signal (−117 ppm) corresponds to the C1 and C3 difluoromethylene units. FIG. 6 shows an F19 NMR spectrum derived from the scale dissolution test employing 20% HFGA of Sample A in Example 4. The spectrum demonstrates the complete consumption of the HFGA and formation of soluble fluorosilicates by the generation of hydrofluoric acid. The spectrum shows signals for several fluorinated silicate species, which do not correspond to hydrofluoric acid, which typically shows a signal at −170 to −180 ppm depending on pH. Rather, the hydrofluoric acid becomes spent during dissolution of the silica scale sample, producing soluble fluorosilicate species ascribed to silicon hexafluoride ($SiF_6^{2-}$)

and/or silicon pentafluoride (SiF5-) that resonate at −128 to −129 ppm, and/or silicon tetrafluoride (SiF$_4$) and/or silicon fluoride (SiF$_3$) that resonate at −105 to −125 ppm, for example.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a treatment fluid comprising a perfluorinated carboxylic acid;
introducing the treatment fluid into a subterranean formation having a temperature of at least about 82° C. and having a siliceous material therein; and
generating hydrofluoric acid from the perfluorinated carboxylic acid; and
dissolving at least a portion of the siliceous material with the generated hydrofluoric acid.

2. The method of claim 1, wherein the siliceous material is selected from the group consisting of silica, diatomite, aluminum ions, calcium ions, iron ions, potassium ions, sodium ions, and any combination thereof.

3. The method of claim 1, wherein the treatment fluid contains no other acids or acid-generating compounds.

4. The method of claim 1, wherein the perfluorinated carboxylic acid has a formula of $C_nF_{(2n+1)}CO_2H$, wherein n is an integer between 1 and 20.

5. The method of claim 1, wherein the perfluorinated carboxylic acid is selected from the group consisting of perfluorosuccinic acid, perfluoroglutaric acid, perfluoro-3,6-dioxaheptanoic acid, perfluorohexanoic acid, perfluoroadipic acid, perfluoro-3,6-dioxaoctane-1,8-dioic acid, perfluoroheptanoic acid, perfluoro-3,6,9-trioxadecanoic acid, perfluorooctanoic acid, perfluorosuberic acid, perfluoro-3,6-dioxadecanoic acid, perfluoro-3,6,9-trioxaundecane-1,11-dioic acid, perfluorononanoic acid, perfluoro-3,5,5-trimethylhexanoic acid, perfluoroazelaic acid, perfluorodecanoic acid, perfluoro-3,7-dimethyloctanoic acid, perfluorosebacic acid, perfluoro-3,6,9-trioxatridecanoic acid, perfluoroundecanoic acid, perfluorododecanoic acid, perfluorododecanedioic acid, perfluorotetradeconoic acid, perfluorohexadecanoic acid, and any combination thereof.

6. The method of claim 1, wherein the treatment fluid has an initial pH of less than about 7.

7. The method of claim 1, wherein the treatment fluid further comprises an additive selected from the group consisting of a silica scale control additive, a surfactant, a gel stabilizer, an anti-oxidant, a polymer degradation prevention additive, a relative permeability modifier, a scale inhibitor, a corrosion inhibitor, a foaming agent, a defoaming agent, an antifoaming agent, an emulsifying agent, a de-emulsifying agent, an iron control agent, a proppant, a particulate, a particulate diverter, a salt, a fluid loss control additive, a gas, a catalyst, a clay control agent, a dispersant, a scavenger, a gelling agent, a lubricant, a breaker, a friction reducer, a bridging agent, a viscosifier, a weighting agent, a solubilizer, a pH control agent, a hydrate inhibitor, a consolidating agent, a bactericide, a delayed release breaker, and any combination thereof.

8. The method of claim 1, wherein the treatment fluid further comprises an aqueous carrier fluid or an oleaginous carrier fluid.

9. The method of claim 1, wherein the treatment fluid is introduced into the subterranean formation above a fracture gradient pressure of the subterranean formation or below the fracture gradient pressure of the subterranean formation.

10. The method of claim 1, further comprising a wellhead with a tubular extending therefrom and into the subterranean formation, and a pump fluidly coupled to the tubular,
wherein the step of: introducing the treatment fluid into the subterranean formation comprises introducing the treatment fluid through the wellbore.

11. A method comprising:
providing a treatment fluid comprising a perfluorinated carboxylic acid;
introducing the treatment fluid into a subterranean formation having a temperature of at least about 82° C. and having a carbonate material therein;
generating hydrofluoric acid from the perfluorinated carboxylic acid; and
dissolving at least a portion of the carbonate material with the generated hydrofluoric acid.

12. The method of claim 11, wherein the carbonate material is selected from the group consisting of calcite, dolomite, siderite, calcium ions, magnesium ions, iron ions, and any combination thereof.

13. The method of claim 11, wherein the treatment fluid contains no other acids or acid-generating compounds.

14. The method of claim 11, wherein the perfluorinated carboxylic acid has a formula of $C_nF_{(2n+1)}CO_2H$, wherein n is an integer between 1 and 20.

15. The method of claim 11, wherein the perfluorinated carboxylic acid is selected from the group consisting of perfluorosuccinic acid, perfluoroglutaric acid, perfluoro-3,6-dioxaheptanoic acid, perfluorohexanoic acid, perfluoroadipic acid, perfluoro-3,6-dioxaoctane-1,8-dioic acid, perfluoroheptanoic acid, perfluoro-3,6,9-trioxadecanoic acid, perfluorooctanoic acid, perfluorosuberic acid, perfluoro-3,6-dioxadecanoic acid, perfluoro-3,6,9-trioxaundecane-1,11-dioic acid, perfluorononanoic acid, perfluoro-3,5,5-trimethylhexanoic acid, perfluoroazelaic acid, perfluorodecanoic acid, perfluoro-3,7-dimethyloctanoic acid, perfluorosebacic acid, perfluoro-3,6,9-trioxatridecanoic acid, perfluoroundecanoic acid, perfluorododecanoic acid, perfluorododecanedioic acid, perfluorotetradeconoic acid, perfluorohexadecanoic acid, and any combination thereof.

16. The method of claim 11, wherein the treatment fluid has an initial pH of less than about 7.

17. The method of claim 11, wherein the treatment fluid further comprises an additive selected from the group consisting of a silica scale control additive, a surfactant, a gel stabilizer, an anti-oxidant, a polymer degradation prevention additive, a relative permeability modifier, a scale inhibitor, a corrosion inhibitor, a foaming agent, a defoaming agent, an antifoaming agent, an emulsifying agent, a de-emulsifying agent, an iron control agent, a proppant, a particulate, a particulate diverter, a salt, a fluid loss control additive, a gas, a catalyst, a clay control agent, a dispersant, a scavenger, a gelling agent, a lubricant, a breaker, a friction reducer, a bridging agent, a viscosifier, a weighting agent, a solubilizer, a pH control agent, a hydrate inhibitor, a consolidating agent, a bactericide, a delayed release breaker, and any combination thereof.

18. The method of claim 11, wherein the treatment fluid further comprises an aqueous carrier fluid or an oleaginous carrier fluid.

19. The method of claim 11, wherein the treatment fluid is introduced into the subterranean formation above a fracture gradient pressure of the subterranean formation or below the fracture gradient pressure of the subterranean formation.

20. The method of claim 11, further comprising a wellhead with a tubular extending therefrom and into the subterranean formation, and a pump fluidly coupled to the tubular,
wherein the step of: introducing the treatment fluid into the subterranean formation comprises introducing the treatment fluid through the wellbore.

* * * * *